US006913455B2

United States Patent
Tsau et al.

(10) Patent No.: US 6,913,455 B2
(45) Date of Patent: Jul. 5, 2005

(54) HOT FILL MOLD SHELL ASSEMBLY WITH REDUCED HEAT TRANSFER

(75) Inventors: Tar Tsau, Burlington (CA); Reinhold Ernst Nitsche, Caledonia (CA); Kyi San Kyi, Burlington (CA)

(73) Assignee: Wentworth Mold Inc., Hamilton (CA)

( * ) Notice: Subject to any disclaimer, the term of this patent is extended or adjusted under 35 U.S.C. 154(b) by 188 days.

(21) Appl. No.: 10/411,177

(22) Filed: Apr. 11, 2003

(65) Prior Publication Data

US 2004/0202745 A1 Oct. 14, 2004

(51) Int. Cl.[7] .......................... B29C 49/48; B29C 49/64
(52) U.S. Cl. ...................... 425/522; 249/102; 249/111; 425/526
(58) Field of Search ............................ 425/522, 192 R, 425/195, 182, 526; 249/102, 155, 111

(56) References Cited

U.S. PATENT DOCUMENTS

| | | | |
|---|---|---|---|
| 3,380,121 A | 4/1968 | Chittenden et al. | |
| 3,768,948 A | * 10/1973 | Horberg et al. | ............. 425/526 |
| 3,861,640 A | 1/1975 | Agneta | |
| 3,978,910 A | 9/1976 | Gladwin | |
| 4,032,278 A | 6/1977 | Kuenzig et al. | |
| 4,151,976 A | 5/1979 | Schurman | |
| RE30,215 E | 2/1980 | Kuenzig et al. | |
| 4,330,248 A | 5/1982 | Platte | |
| 4,476,170 A | * 10/1984 | Jabarin | .................... 428/36.92 |
| 4,699,585 A | * 10/1987 | Giese et al. | ................. 425/522 |
| 4,815,960 A | 3/1989 | Rudolph | |
| 4,822,543 A | * 4/1989 | Iizuka et al. | ................. 264/521 |
| 4,863,046 A | 9/1989 | Collette et al. | |
| 4,884,961 A | * 12/1989 | Iizuka et al. | ................. 425/195 |
| 4,927,680 A | 5/1990 | Collette et al. | |
| 5,217,729 A | * 6/1993 | Terauchi et al. | ............. 425/522 |
| 5,255,889 A | 10/1993 | Collette et al. | |
| 5,411,699 A | 5/1995 | Collette et al. | |
| 5,571,474 A | 11/1996 | Przytulla | |
| 5,766,299 A | * 6/1998 | Miller | ......................... 65/261 |
| 5,968,560 A | 10/1999 | Briere et al. | |
| 6,113,377 A | 9/2000 | Clark | |
| 6,428,302 B1 | 8/2002 | Tsau | |
| 6,444,159 B2 | 9/2002 | Petre | |
| 6,447,281 B1 | 9/2002 | Petre | |

FOREIGN PATENT DOCUMENTS

| | | | |
|---|---|---|---|
| CA | 2082350 | 11/1995 | |
| CA | 2313881 A1 | * 1/2002 | ........... B29C/49/48 |
| GB | 2 240 300 | 7/1991 | |
| JP | 63-202425 | 8/1988 | |

* cited by examiner

Primary Examiner—Robert B. Davis

(57) ABSTRACT

A hot fill hot fill mold assembly has two mold half shells and two mold half carriers for supporting the mold half shells. The shells each have an inner wall that defines the shape of at least a portion of the container to be formed. Each shell has outer wall surface portions and a plurality of spaced apart slotted grooves extending between the outer wall surface portions that define open air spaces recessed from the outer wall portions. The mold half carriers have a carrier inner wall that overlays in contacting and thermal conducting relation the outer wall surface portions of a corresponding one of the mold half shells and overlays the spaced apart slotted grooves to create thermal buffering open air pockets between the mold half shells and the mold half carriers so as to reduce the thermal conduction away from the mold face and improve hot fill container formation.

11 Claims, 5 Drawing Sheets

HOT FILL MOLD SHELL ASSEMBLY WITH REDUCED HEAT TRANSFER

RELATED APPLICATION

The present application is related to Applicant's commonly assigned U.S. patent application Ser. No. 10/411,339 filed concurrently herewith and entitled Mold Assembly with Modular Mold Shells.

FIELD OF THE INVENTION

The present invention relates to molds for making containers, and more particularly, to molds used in hot fill applications having shell inserts carried by mold carriers where the shells have recessed outer wall slots that buffer heat transfer out from the shell inserts to the mold carriers.

BACKGROUND OF THE INVENTION

Mold assemblies comprising two side mold parts and a base mold part are commonly used in the formation of plastic containers such as, for example, biaxially-oriented PET (polyethylene terephthalate) beverage bottles. The side mold parts may comprise a unitary half-part, multiple half-parts or a unitary shell half insert.

In hot fill, applications, such as, for example, formation of juice containers that are subsequently filled with hot juices, it is important to maintain elevated temperature levels at the forming surface where the mold face contacts the plastic of the container to form a plastic container capable of withstanding hot filling temperatures of liquids subsequently filled in the container. This is typically accomplished by having heating passages contained in the mold through which hot fluid passes to keep the mold face at the elevated predetermined temperature. The problem with present molds is that heat dissipates away from the mold face to the outer walls of the mold requiring greater heat energy to maintain the elevated predetermined temperature. This heat dissipation also occurs in interchangeable mold shell inserts that are supported in direct contact with standardized mold carriers as the heat is dissipated by conduction directly from the shell insert and out through the mold carrier.

SUMMARY OF THE INVENTION

It is desired to provide a hot fill mold assembly having shell inserts and mold carriers that are better suited for hot fill applications.

It is also desired to provide a hot fill mold assembly having shell inserts and mold carriers with reduced heat transfer properties.

In the present invention the hot fill mold assembly has two mold half shells that each have an outer wall and an inner wall that defines the shape of at least a portion of the container to be formed. The mold half shells have a plurality of channels extending therethrough that are adapted for receiving a liquid to heat the mold half shells. The assembly has two mold half carriers each having a carrier inner wall overlaying in contacting thermal conducting relation a corresponding outer wall of the mold half shells for supporting the mold half shells in the hot fill mold assembly. In the present invention, at least one of the outer wall of each of the mold half shells and the inner wall of each of the mold half carriers has a pattern of grooves formed therein to reduce contact surface area between the outer wall and inner wall whereby the pattern of grooves buffer thermal conduction between the inner wall and the outer wall. These grooves act to improve hot fill container formation.

The grooves act to minimize the contact area between the outer walls of the mold half shells and the inner walls of the mold half carrier. It should be understood that grooves may be left as open air pockets or alternatively may be filled with a thermal insulating materials such as, for example, rubber or pastes.

Preferably, the pattern of grooves comprises a series of spaced apart elongated grooves that extend axially around the mold assembly and are longitudinally spaced along the length of the mold assembly. Alternatively, the pattern of grooves may comprise a pattern of intersecting grooves such as a series of intersecting lines forming a rectangular patterns.

It is also envisaged that the mold half shells include a plurality of exhaust passageways extending from the inner wall of the mold half shells into at least one of the grooves whereby air is exhausted through the exhaust passageways, the at least one groove, and between the outer wall of the mold half shell and inner wall of the mold half carrier to ambient. It should be understood that the air from the cavity formed from the mold half shells has to escape and not be trapped inside the cavity to permit container expansion during container formation. Such passageways provide one means of allowing the air to escape.

It should be understood that the pattern of grooves may be formed in either of the mold half carriers or the mold half shells. However because mold carriers are standardized in the field and shell inserts are fitted to the mold carriers for the formation of different container shapes, it is more likely that the shell inserts are modified for the inclusion grooves. Preferably a plurality of grooves extend in half rings about the outer wall of each of the mold half shells and are axially spaced from each other.

In accordance with a preferred aspect there is provided a hot fill mold assembly for forming a container. The assembly comprises two mold half shells each comprising an inner wall that defines the shape of at least a portion of the container to be formed. Each mold half shell has outer wall surface portions and a plurality of spaced apart slotted grooves extending between the outer wall surface portions that are recessed from the outer wall portions. The assembly further comprises two mold half carriers for supporting the two mold half shells. Each mold half carrier has a carrier inner wall overlaying in contacting and thermal conducting relation the outer wall surface portions of a corresponding one of the mold half shells and overlaying the spaced apart slotted grooves to create thermal buffering pockets between the mold half shell and the mold half carrier.

BRIEF DESCRIPTION OF THE DRAWINGS

For a better understanding of the nature and objects of the present invention reference may be had to the accompanying diagrammatic drawings in which.

DETAILED DESCRIPTION OF THE PREFERRED EMBODIMENTS

Figure 1:
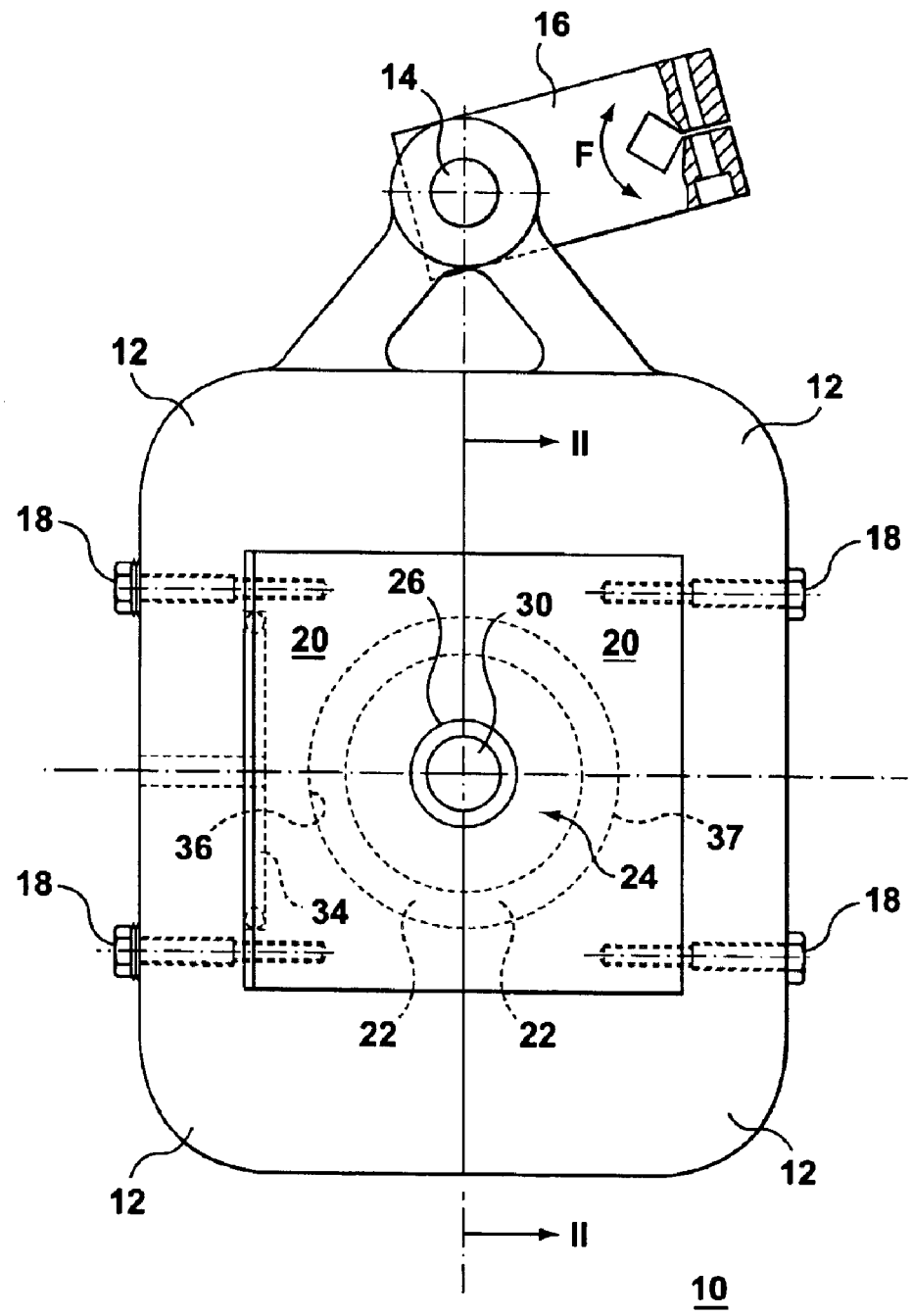
FIG. 1 is a plan view of the mold assembly of the present invention.

Referring to the drawings the preferred embodiments of the present invention is described. While the mold apparatus described herein is adapted for making a hot fill PET bottle it should be understood that the mold apparatus shown can be used for other types of containers where the mold face is changed, such as for example, soft drinks, cleansers and detergent type containers to name a few.

In FIG. 1 the mold assembly 10 includes a pair of support arms 12 which pivot about pivot pin or axis 14. A lever arm 16 causes the support arms 12 to pivot about axis 14 to move the support arms 12 into the closed position shown. The support arms 12 support, through threaded bolts 18, or any other suitable connecting device, two mold half carriers 20. The mold half carriers 20 each carry a modular mold half shell 22. In the closed position shown, modular mold half shells 22 define a cavity 24 whose shape determines the shape of the container formed in the cavity 24. During container formation, the support arms 12 hold the mold half carriers 20 and shells 22 in the closed position shown.

Figure 2:
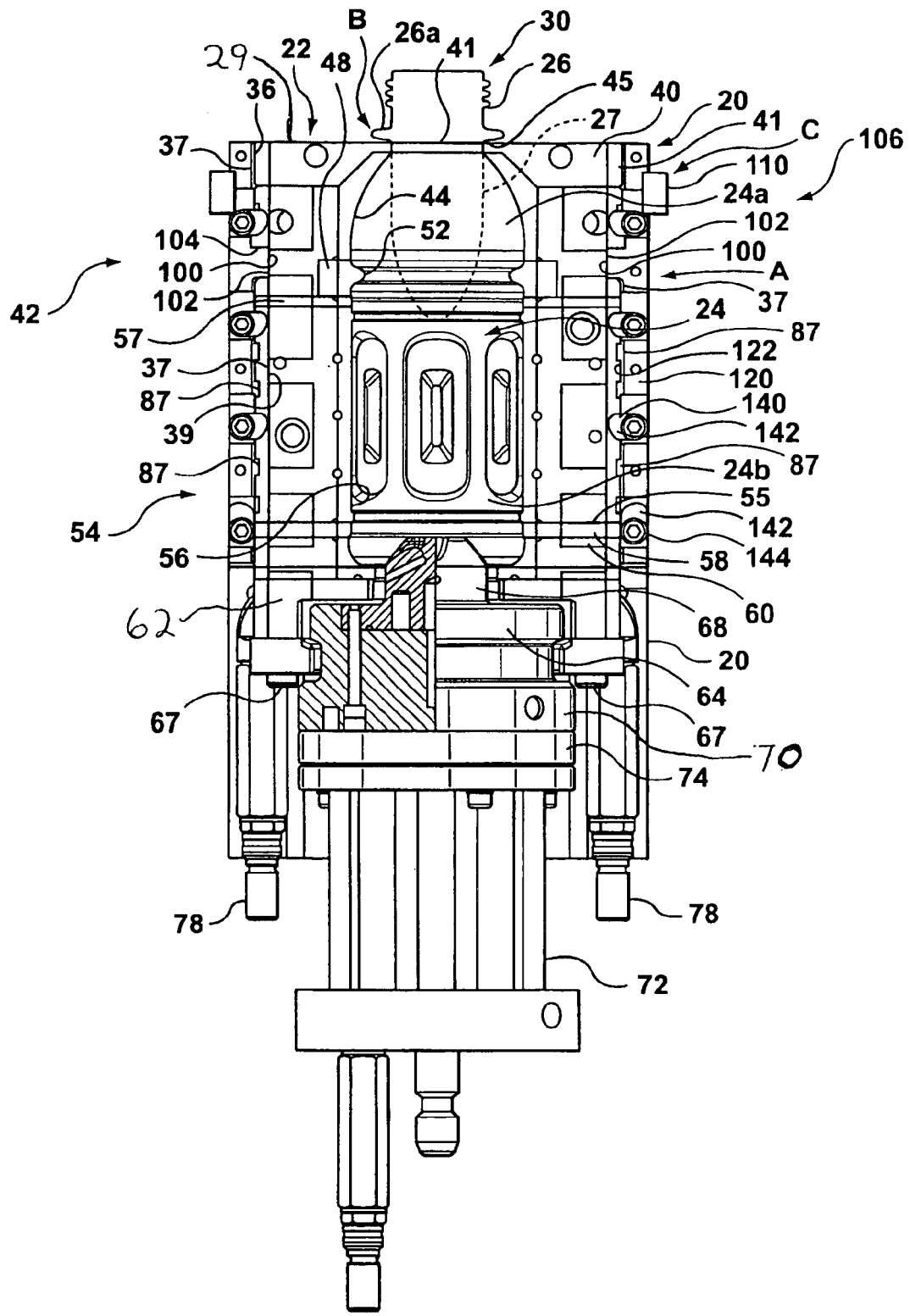
FIG. 2 is a side sectional view of the mold assembly as seen at lines II—II of FIG. 1.
Figure 3:
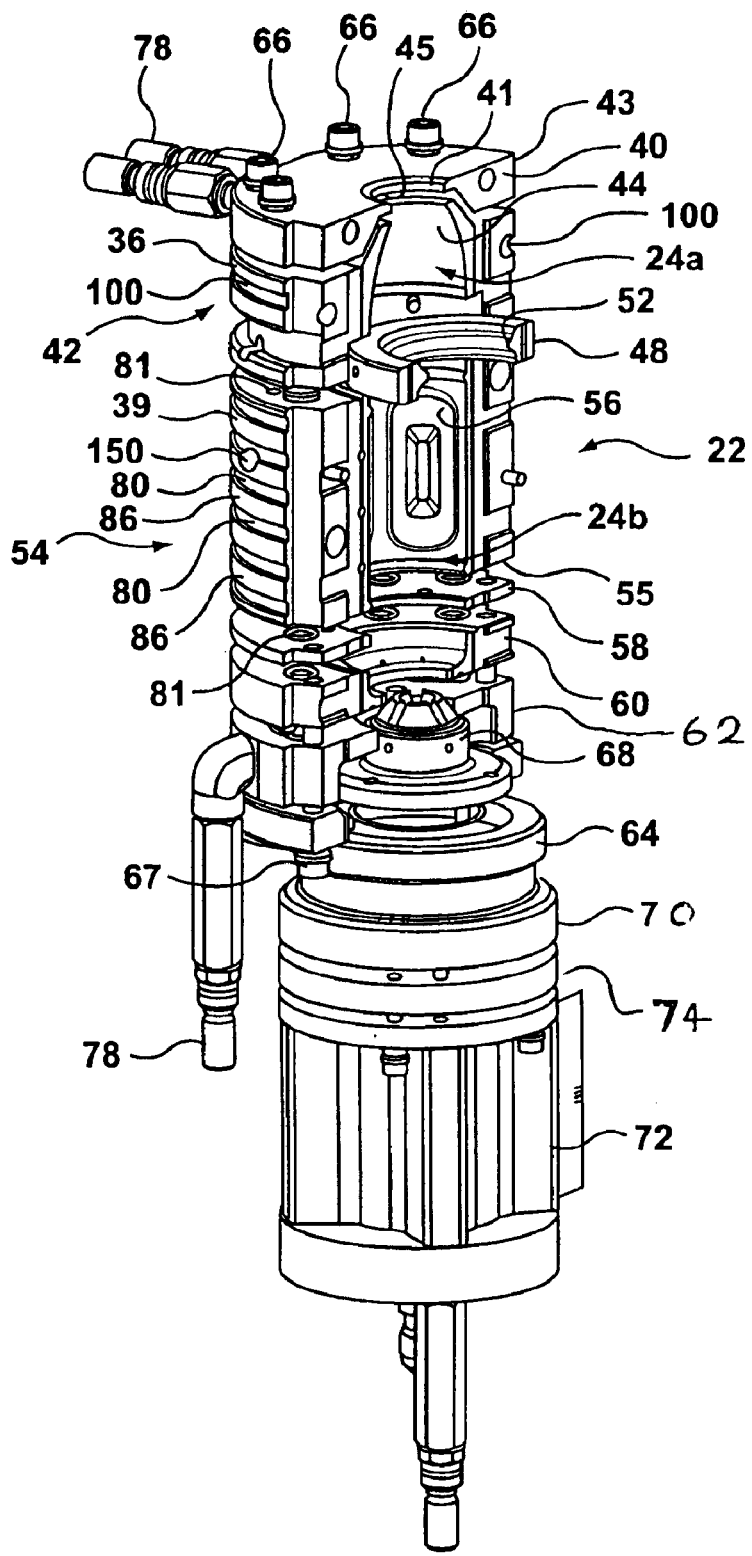
FIG. 3 is a partially exploded view of a portion of an alternative embodiment of the mold assembly illustrating one lower shim lower body mold section.

Referring to FIGS. 1 to 3, a plastic preform 30 has a neck 26 and an elongated tubular portion 27. The neck 26 is mounted by a molding machine (not shown) against top surface 29 of the mold shells 22 with the tube portion 27 of the preform 30 extending into the cavity 24 of the mold shells 22. Pressurized air is blown by a nozzle into neck 26 of a preform 30 to expand tube 27 into the cavity 24. Later in the formation, the support arms 12 are pivoted about axis 14 to separate the carriers 20 and shells 22 to permit removal of the formed container and to permit interchanging of shells 22 from carriers 20.

The two modular mold half shells 22 each have an upper body mold section 42 and a lower body mold section 54 releasably secured to the upper body mold section 42. The upper body mold section 42 has upper inner walls 44 defining an upper cavity 24a whose dome shape corresponds to at least an upper portion of the container to be formed. The upper body mold section 42 has a first outer wall 36 that buts against inner wall 37 of one of the carriers 20. The lower body mold section 54 has body inner walls 56 defining a lower cavity 24b that corresponds to at least a portion of the body of the container to be formed. The lower body mold section 54 has a second outer wall 39 also butting against the inner wall 37 of one of the carriers 20. As best seen in FIG. 3, the outer wall 39 comprises spaced apart outer wall surface portions 86 inter spaced by recessed grooves 80.

Figure 2A:
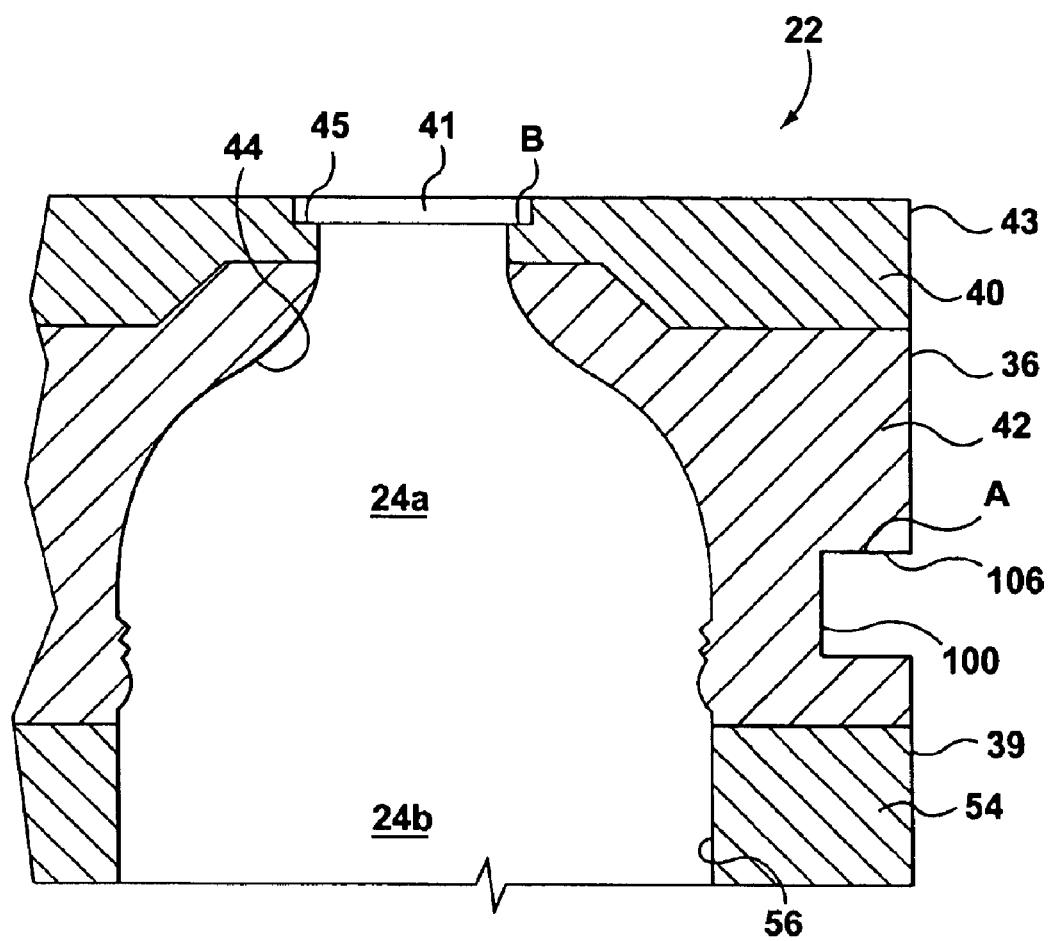
FIG. 2a is a partial enlarged side sectional view of the modular mold half shells of FIG. 2.

In addition to the modular parts of each mold half shell 22 described above each mold half shell 22 comprises top cavity inserts 40 which define an aperture or opening 41 through which the preform 30 may be inserted. The top cavity insert 40 forms a composite part of the upper body mold section 42. The top cavity inserts 40 have third outer walls 43 which are also surrounded by the inner walls 37 of the carriers. As best seen in FIG. 2a, the top cavity inserts 40 have a seating surface 45. In this embodiment, the seating face 45 is recessed in the top cavity inserts 40 and surrounds the aperture 41. The seating face 45 may alternatively be elevated or comprise several faces positioned on the same plane. The seating face 45 is adapted to receive the neck 26 of the preform 30 and positively locate the neck 26 against the seating face 45.

The upper body mold section 42 is further adapted to receive cavity insert 48 which has a convex shaped groove 52 that is formed in the container and is best shown in FIG. 3.

The upper body mold section 42 has a continuous axially extending groove 100 that extends around the periphery of the first outer wall 36. The mold carriers 20 each include a ring shaped flange member 102 (see FIG. 2) formed integrally with the mold carriers 20 that extends inwardly from the inner walls 37 of the carriers 20. Alternatively, the flange member 102 can be an independent part that also fits into a corresponding groove in the inner walls 37 of the mold half carriers 20. The flange member 102 has an upper shoulder 104 against which an upper ledge 106 of the groove 100 rests by gravity so as to maintain the vertical registry of the mold carrier 20 adjacent flange member 102 at location A in a fixed vertical relation to the seating face 45 of the top cavity inserts 40 at location B. Furthermore, the mold carriers 20 are located relative to the arms 12 by a locating ring 110. This locating ring 110 represents a position C.

It should be understood that the position C of the mold carriers 20 is maintained in a fixed position relative to the molding machine (not shown). Further due to the vertical registry between the upper mold sections 42 and the mold carriers 20 provided by the carrier interconnecting or flange member 102, location A of the carriers 20 remains fixed vertically relative to location B of the top cavity inserts 40. Hence, the location of the top cavity inserts 40 at location B is fixed vertically relative to the mold machine so as to provide for the proper insertion of the tubular portion 27 of the preform 30 into cavity 42 and the proper positioning of the preform neck 26 at it's flange 26a against the seating surface 45 of the modular mold shells 22.

The present invention provides for the lower body mold sections 54 to be releasably secured with the upper body mold sections 42. This permits for the lower body mold sections 54 to be held in indirect vertical registry with the mold carriers 20. Consequently the length of the lower body mold sections 54 may be altered to accommodate containers of various body lengths and shapes without effecting the relative fixed locations A and B between the mold machine and top surface portions 29 of the upper body mold sections 42.

The parting faces between the mold carriers 20 and the carrier shells 22 are shown in FIG. 2 for the mold carriers 20 at parting face 120 and for the mold half shells or modular half shells 22 at parting face 122. While the vertical registry of the modular half shells 22 is maintained by the groove 100 and flange ring 102, it should be understood that the shells 22 are releasably secured within the carriers 20 by latches 140. The latches 140 comprise tabs 142 that are rotated about locating bolts 144 mounted to the parting face 120 of the carriers 20. The tabs 142 are rotated from a vertical position to a horizontal position across the parting face 122 of the shells 22 so as to secure the shells 122 within the cavity formed in the mold carriers 20 when bolts 144 are tightened.

Referring to FIGS. 2 and 3, the modular mold shells 22 are shown to co-operate with a push up base 68 to define the base of the container to be formed. The base 68 rests upon base holder 70 which is mounted to pedestal 72 via a pedestal spacer 74.

Located below the upper body mold section 42 and forming part of the mold half shell 22 is the main lower body mold section 54. The lower body mold section 54 has a lower surface 55 against which buts a shim mold section 58. The purpose of the shim mold section 58 is to provide for a vertical length adjustment in the container body. It should be understood that while the embodiments of FIGS. 2 and 3 show a shim mold section 58 located below the main lower body mold section 54, it is also possible that a similar shim mold section 57, as seen in FIG. 2, may be located between the upper body mold section 42 and the main mold body section 54 so as to provide for the symmetrical elongation of the container.

Positioned below the shim mold section 58 is a bottom cavity insert 60. The bottom cavity insert 60 cooperates with the push up base 68 to define the bottom shape or contour of the container to be formed. Located immediately below the ring 60 is a lower cavity insert 62 which is also mounted in buffing relation on top of a wear ring 64.

The modular mold shell assembly 22 is held together by a first series of four axially spaced apart fasteners 66 (see FIG. 3) passing through the top cavity insert 40, the upper body mold section 42, and into the main body portion 54. The fasteners 66 comprise threaded bolts that are received within a recessed apertures (not shown) in the top cavity insert 40. The threaded bolts 66 thread into corresponding threaded apertures in the main body portion 54.

Second fasteners 67 comprising a series of four fasteners 67 positioned axially in spaced relation about the mold half shell 22 are received within recessed slots in the wear ring plate 64 and pass through the bottom ring 62, the bottom cavity insert 60 and subsequently the shim 58 into the main body section 54. The main body section 54 has threaded female apertures (not shown) for receiving the threaded ends of the second fasteners 67.

By having two separate sets of fasteners 66 and 67 it is possible to disassemble only an upper or lower portion of the modular mold half shells 22. For instance, if one wishes to remove the lower shim 58 to reduce the overall length of the container, all one has to do is remove the second fasteners 67. Further, if one wishes to insert an additional shim between the main body portion 54 and the upper body mold sections 42, then only the upper or first fasteners 66 need to be removed. By providing modular half shells 22, the present invention allows for a quick change shell insert that may be modified to accommodate for varying lengths in the length of the container to be formed without requiring the necessity to buy a complete mold shell for each variation of container to be formed.

In the present application, the mold assembly 10 is utilized as a hot fill mold and comprises passageways or channels 78 provided at both the bottom and top of the shells 22 for supplying liquid, such as for example, oil, into the shells 22 to regulate the temperature of the mold half shells 22. The passageways 78 at the bottom shells 22 pass into the body ring 62 and up through the mold half shells 22 and out through the upper passageways 78 mounted into the top cavity insert 40. O-rings 81 (see FIG. 3) are provided between each of the sections of the mold half shells 22 so as to provide a sealed passageway extending through the mold half shells 22. In operation, heated fluid under pressure passes through one of the passageways 78 and through the mold half shells 22 and out the other end of the mold half shells 22 so as to heat inner walls 44, 56 of the upper body mold sections 42 and the lower body mold sections 54.

Figure 4:
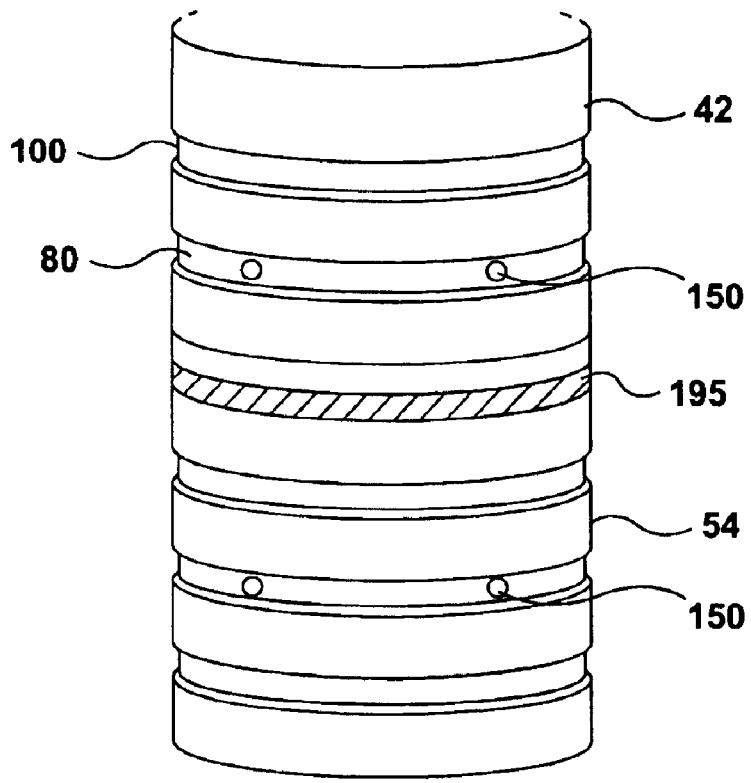
FIG. 4 shows a first pattern of grooves located on the outer walls of the mold half shells; and, FIG. 5 shows a second pattern of grooves located on the outer walls of the mold half shells.
Figure 5:
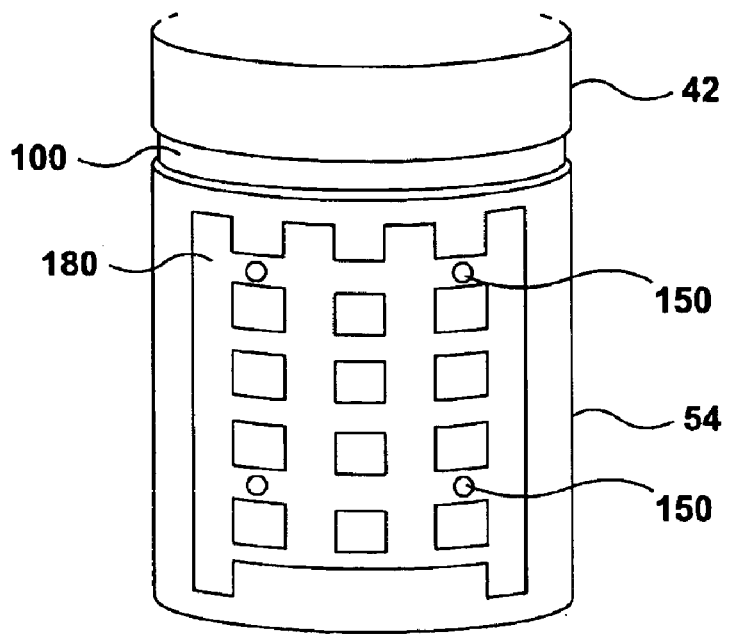

Referring to FIGS. 2 to 5 another feature of the mold half shells 22 is shown by the use of two different patterns of grooves 80 in FIGS. 2, 3, 4 and 180 in FIG. 5. These patterns of grooves 80, 180 are machined into the outer surface of both the main mold section 54 and the upper body mold section 46. The pattern of grooves 80 provide a series of longitudinally spaced apart slotted apertures providing axially extending recessed open air spaces 87. The mold half carriers 20 are adapted to surround the mold half shells 22 with the inner walls 56 of the mold half carriers 20 contacting the outer wall surface portions 86 of the mold half shells 22. This forms a series of longitudinally spaced apart open air pockets 87 extending axially around the mold half shells 22 to create thermal buffering pockets 87 that reduce thermal conduction from the mold face through the shells 22 and out through the mold carriers 20.

In the alternative embodiment of FIG. 5, a pattern of intersecting grooves is shown at 180. This pattern shows the grooves extending orthogonally to each other however the pattern is shown to simply represent that more than one form of pattern of grooves may be applied that either run in parallel to each other or intersect with each other, for example.

Also shown in FIGS. 3 through 5 are exhaust passageways 150. The exhaust passageways 150 may be located either in the grooves 80 or 180 or in the outer wall portions 87 that are spaced between each of the grooves 80, 180. The purpose of the exhaust passageways 150 is to provide an air way between the cavity 42 defined by the inner walls 44, 56 of the mold shells 22 and the outer walls 36, 39 of the mold shells 22. The air passageways 150 permit air to escape from the cavity 42 as the preform 30 is formed into a container against the inner walls 44, 56 of the mold shells 22. As the air escapes, it will flow into the grooves 80, 180 and then between the mold carriers 20 and mold shells 22 and out from the mold assembly 10 to ambient.

In FIG. 4, one of the grooves 80 is shown filled with an insulating material 195. It should be understood that all or some of the grooves may be filled with insulating material 195. The thermal buffering provided by the insulating material is better than that of air and may be preferred in certain applications. Further, the material 195 may comprise, for example, rubber cut to fit into the slots and provided with exhaust passageways where necessary. Alternatively, the insulating material may, for example, comprise an paste that solidifies after it is inserted into the grooves 80.

It should be understood at alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A hot fill mold assembly for forming a container, the hot fill mold assembly comprising:

two mold half shells each comprising an outer wall and an inner wall that defines the shape of at least a portion of the container to be formed, each of the mold half shells having a plurality of channels extending therethrough adapted for receiving a liquid to heat the mold half shells;

two mold half carriers each having a carrier inner wall overlaying in contacting thermal conducting relation a corresponding outer wall of the mold half shells for supporting the mold half shells in the hot fill mold assembly; and, at least one of the outer wall of each of the mold half shells and the inner wall of each of the mold half carriers having a pattern of grooves formed therein to reduce contact surface area between the outer wall and inner wall whereby the pattern of grooves buffer thermal conduction between the inner wall and the outer wall.

2. The hot fill mold assembly of claim 1 wherein the pattern of grooves comprises a series of spaced apart elongated grooves.

3. The hot fill mold assembly of claim 2 wherein the pattern of spaced apart elongated grooves extend axially around the mold assembly and are longitudinally spaced along the mold assembly.

4. The hot fill mold assembly of claim 1 wherein the pattern of grooves comprises a pattern of intersecting grooves.

5. The hot fill mold assembly of claim 1 wherein each of the mold half shells comprises a plurality of exhaust passageways extending from the inner wall of the mold half shells into at least one of the grooves whereby air is exhausted through the exhaust passageways, the at least one groove, and between the outer wall of the mold half shell and inner wall of the mold half carrier to ambient.

6. The hot fill mold assembly of claim 1 wherein the two mold half shells comprise modular mold shells each comprising at least an upper body mold section and a lower body mold section.

7. The hot fill mold assembly of claim 1 wherein the pattern of grooves are filled with an thermally insulating material.

8. A hot fill mold assembly for forming a container, the hot fill mold assembly comprising:

two mold half shells each comprising an inner wall that defines the shape of at least a portion of the container to be formed, each mold half shell having outer wall surface portions and a plurality of spaced apart slotted grooves extending between the outer wall surface portions that are recessed from the outer wall portions; and, two mold half carriers for supporting the two mold half shells, each mold half carrier having a carrier inner wall overlaying in contacting and thermal conducting relation the outer wall surface portions of a corresponding one of the mold half shells and overlaying the spaced apart slotted grooves to create thermal buffering pockets between the mold half shell and the mold half carrier.

9. The hot fill mold assembly of claim 8 wherein the plurality of grooves extend in half rings about the outer wall.

10. The hot fill mold assembly of claim 8 wherein the mold half shells are modular mold half shells each comprising:

an upper body mold section having upper body inner walls defining an upper body cavity whose shape corresponds to the upper body of the container to be formed and at least one lower body mold section releasably secured with the upper body mold section.

11. The hot fill mold assembly of claim 8 wherein the spaced apart slotted grooves are filled with a thermally insulation material.

* * * * *